(12) United States Patent
Hsu et al.

(10) Patent No.: US 10,469,426 B2
(45) Date of Patent: Nov. 5, 2019

(54) CONTENT DELIVERY CONTROL

(71) Applicant: Microsoft Technology Licensing, LLC, Redmond, WA (US)

(72) Inventors: Stephanie Hsu, San Francisco, CA (US); Wooju Choi, San Francisco, CA (US); Mario Estrada, San Francisco, CA (US); Anthony Lawrence Jackson, San Francisco, CA (US); Isura Harshana Edirisinghe, Walnut Creek, CA (US); Stephen Quirk, Piedmont, CA (US); Cameron Hindle Hughes Lock, Oakland, CA (US); Manuel Munoz Selera, San Francisco, CA (US); Omer-Moshe Gelbard, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 216 days.

(21) Appl. No.: 15/181,533

(22) Filed: Jun. 14, 2016

(65) Prior Publication Data
US 2017/0359290 A1 Dec. 14, 2017

(51) Int. Cl.
*G06F 3/0482* (2013.01)
*G06F 3/0485* (2013.01)
*H04L 12/58* (2006.01)

(52) U.S. Cl.
CPC ............ *H04L 51/16* (2013.01); *G06F 3/0482* (2013.01); *G06F 3/0485* (2013.01); *H04L 51/32* (2013.01)

(58) Field of Classification Search
CPC ....... H04L 51/16; H04L 51/32; G06F 3/0482; G06F 3/0485
See application file for complete search history.

(56) References Cited

U.S. PATENT DOCUMENTS

| | | | |
|---|---|---|---|
| 8,745,161 B2 * | 6/2014 | Darnell | H04L 67/1095 709/218 |
| 2005/0188320 A1 | 8/2005 | Bocking | |
| 2005/0192822 A1 | 9/2005 | Hartenstein et al. | |
| 2005/0216837 A1 | 9/2005 | Washburn | |
| 2010/0036832 A1 | 2/2010 | Griffith et al. | |
| 2011/0231499 A1 * | 9/2011 | Stovicek | H04M 1/72547 709/206 |
| 2013/0066876 A1 * | 3/2013 | Raskino | G06F 17/30528 707/741 |
| 2014/0310365 A1 * | 10/2014 | Sample | H04L 51/16 709/206 |

(Continued)

OTHER PUBLICATIONS

Falconer, Joel, "Aggregate Your Social Networks with EventBox", Published on: Dec. 16, 2008 Available at: http://www.lifehack.org/articles/technology/aggregate-your-social-networks-with-eventbox.html.

(Continued)

*Primary Examiner* — Amy Ng
*Assistant Examiner* — Nicole E Kim
(74) *Attorney, Agent, or Firm* — Christopher J. Volkmann; Kelly, Holt & Christenson, PLLC

(57) ABSTRACT

A group feed is displayed for a selected group by a private social network service. The group feed displays only threads with unviewed content along with a user actuatable display element that allows the user to switch to a feed that displays all content for the group.

20 Claims, 14 Drawing Sheets

(56) References Cited

U.S. PATENT DOCUMENTS

2014/0324984 A1* 10/2014 Chang ................. H04L 51/32
709/206

OTHER PUBLICATIONS

Oosterveld, Jasper, "New Yammer Group Experiences announced", Published on: Nov. 18, 2015 Available at: http://www.jasperoosterveld.com/2015/11/new-yammer-group-experiences-announced/.

"Canvas", Retrieved on: Apr. 8, 2016 Available at: https://guides.instructure.com/m/4152/I/42679-how-do-i-find-my-unread-messages-in-conversations.

Basu, Saikat, "10 Ways to Make the Most of Google Groups", Published on: Sep. 16, 2013 Available at: http://www.makeuseof.com/tag/10-ways-to-make-the-most-of-google-groups/.

"DITO", Published on: Mar. 2014 Available at: http://www.ditoweb.com/blog/2014/03/google-groups-tips-for-managing-your/.

"Information about the Inbox in Yammer", Retrieved on: Apr. 8, 2016 Available at: https://support.microsoft.com/en-in/kb/2840532.

"Inoreader Forum—Feed limit", Retrieved on: Apr. 8, 2016 Available at: http://forum.inoreader.com/index.php?/topic/10536-feed-limit/.

Young, Damien, "Lotus Notes—No emails showing up in Inbox—but are in "all documents" folder?", Published on: Jun. 4, 2012 Available at: https://community.spiceworks.com/topic/231092-lotus-notes-no-emails-showing-up-in-inbox-but-are-in-all-documents-folder.

"All posts in ngreader", Published on: Jan. 5, 2013 Available at: http://nextmatters.com/category/ngreader/.

\* cited by examiner

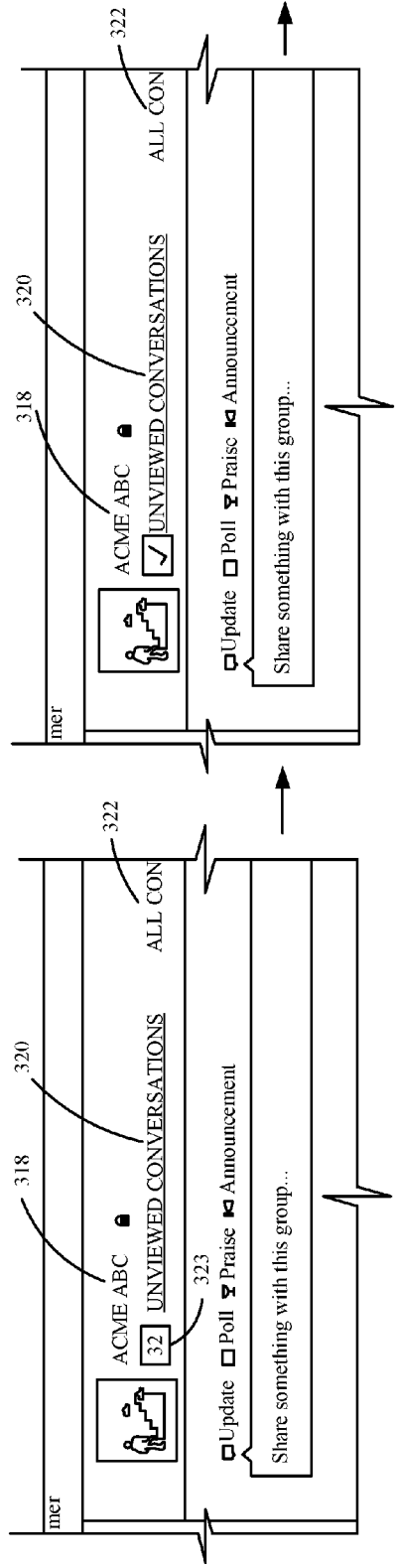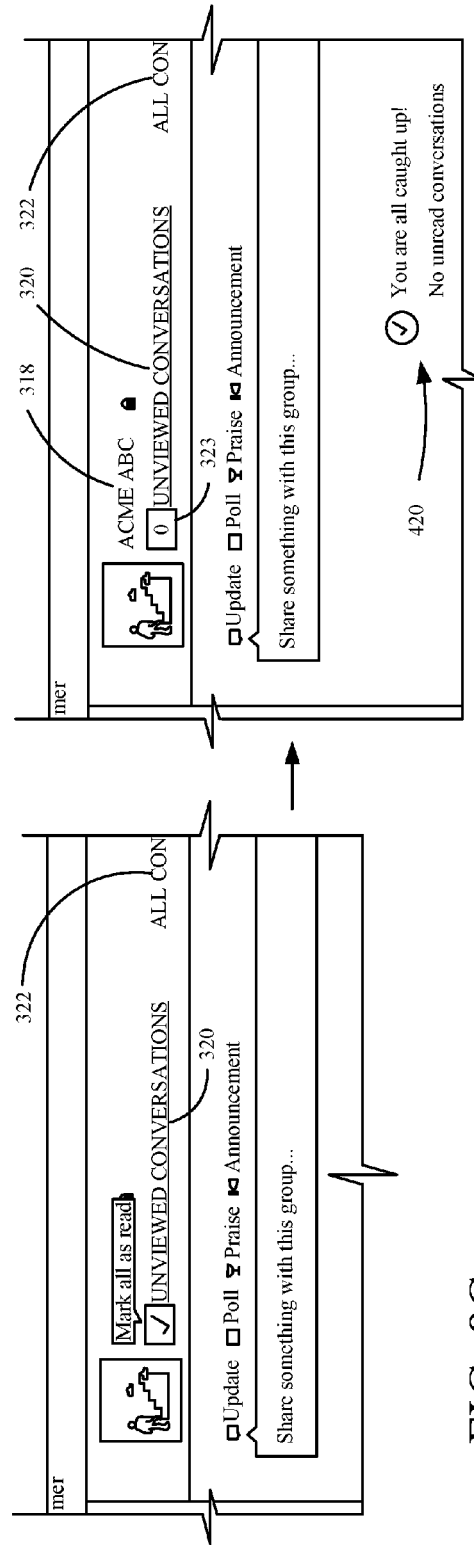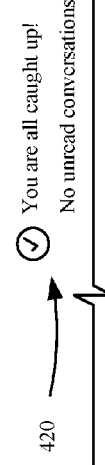
FIG. 8A
FIG. 8B
FIG. 8C
FIG. 8D

CONTENT DELIVERY CONTROL

BACKGROUND

Computer systems are currently in wide use. Some computer systems are used to provide social networking services.

As one example, a social networking service may be provided for private communications within an organization. Access to such a network may, for instance, be determined by a user's Internet domain so that only individuals with approved e-mail addresses may join their respective networks. In such networks, a user may subscribe to, or otherwise obtain membership in, a group. A group may correspond to a certain subject matter, a product group, a team, or a wide variety of other entities within an organization. The private social network service provides a platform for authoring and posting messages to a group message feed, and for other collaboration activities.

When a user belongs to a group, the private social network service allows the user to receive the message feed from the group. The feed illustratively displays messages that have been posted to that group.

In some such systems, a user can interact with messages in a feed. For instance, the user can reply, like, expand or otherwise interact with a message. A message, and its corresponding replies, comprise a thread. Therefore, a group feed within such a social network system can be comprised of a plurality of different threads, each thread including a plurality of different messages or other posts.

It is not uncommon for users of such systems to belong to a relatively large number of groups. Therefore, it can be difficult for a user to ensure that he or she is up to date on the content posted to the feeds for the various groups to which the user belongs.

The discussion above is merely provided for general background information and is not intended to be used as an aid in determining the scope of the claimed subject matter.

SUMMARY

A group feed is displayed for a selected group by a private social network service. The group feed displays only threads with unviewed content along with a user actuatable display element that allows the user to switch to a feed that displays all content for the group.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 7-8D show examples of user interface displays.

DETAILED DESCRIPTION

Figure 1:
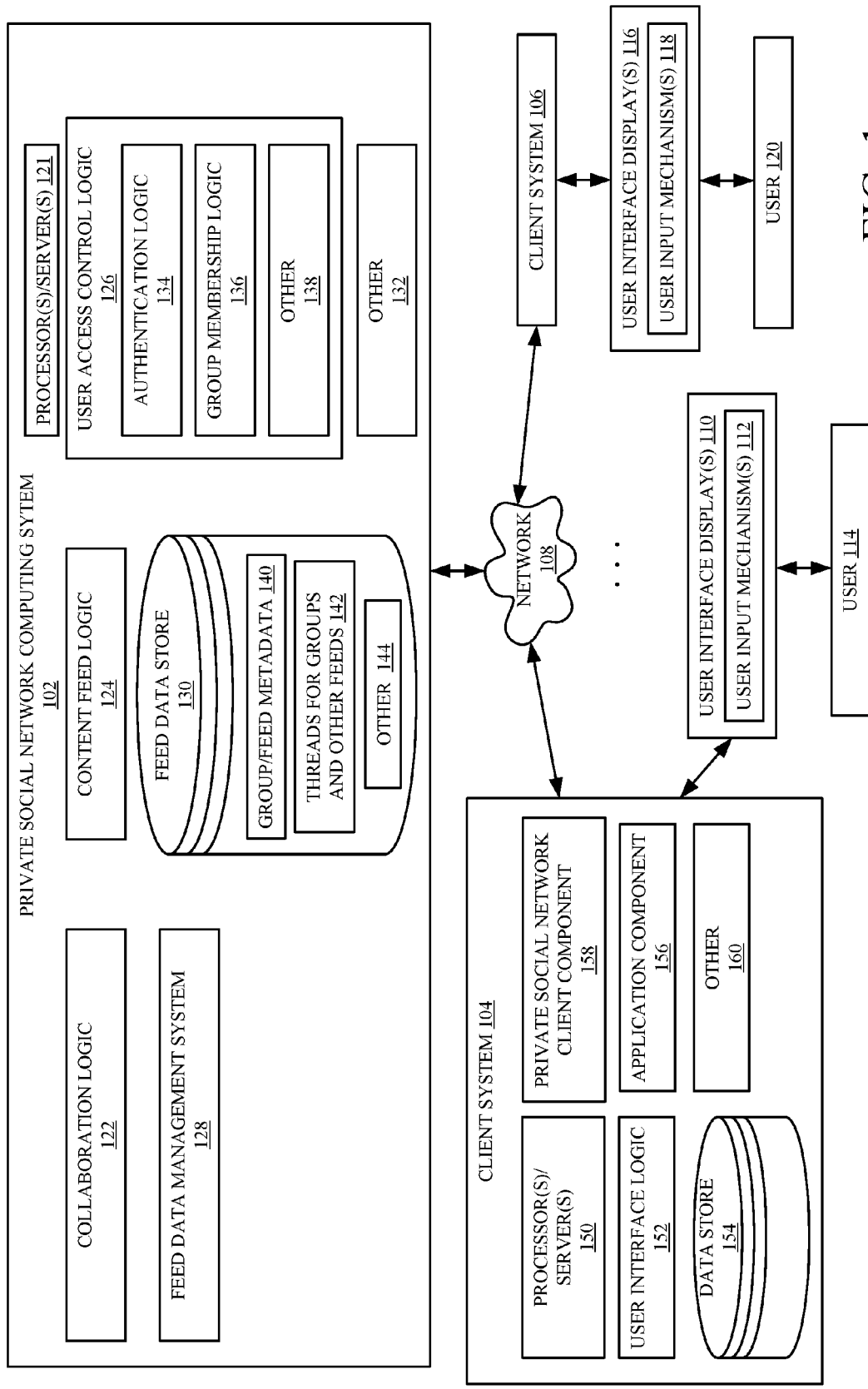
FIG. 1 is a block diagram of one example of a private social network architecture.

FIG. 1 is a block diagram of one example of a private social network architecture 100. Architecture 100 illustratively includes private social network computing system 102 that is accessible by client systems 104-106 over a network 108. Network 108 can be a wide variety of different networks, such as a wide area network, a local area network, a close field communication network, etc. Client system 104 is shown generating user interface displays 110 with user input mechanisms 112 for interaction by user 114. User 114 illustratively interacts with user input mechanisms 112 in order to control and manipulate client system 104, and also private social network computing system 102.

It should be noted that, while the present discussion will proceed with respect to various functionality and logic being provided on private social network computing system 102 and various other functionality and logic being provided on the client systems, this need not be the case. Instead, some of the functionality and logic shown on computing system 102 may be provided on client system 104 in addition, or instead. Also, some of the functionality and logic shown on client system 104 may be provided on computing system 102 in addition, or instead. All of these architectures are contemplated herein.

Similarly, client system 106 is shown generating user interface displays 116 with user input mechanisms 118 for interaction by user 120. User 120 illustratively interacts with user input mechanisms 118 in order to control and manipulate client system 106 and private social network computing system 102.

Private social network computing system 102 illustratively provides private social network services to users 114-120, through their corresponding client systems 104-106. Private social network computing system 102 thus illustratively includes processors or servers 121, collaboration logic 122, content feed logic 124, user access control logic 126, feed data management system 128, feed data store 130, and it can include a wide variety of other items 132. User access control logic 126 illustratively includes authentication logic 134, group membership logic 136, and it can include other items 138. Users 114-120 illustratively provide authentication information through authentication logic 134 which allows the users to join groups in private social network computing system 102. Group membership logic 136 illustratively tracks the membership within those groups. Feed data store 130 illustratively includes group/feed metadata 140, threads 142 for group feeds and for other feeds, and it can include other items 144. Feed data management system 128 illustratively manages the group and feed metadata 140 so that it defines the various groups that are setup within system 102, and to which various users can belong. The group and feed metadata 140 illustratively defines different characteristics of the different groups (such as the subject matter of the group, different subcategories within the group, etc.). The threads 142 for the group feeds and for other feeds illustratively contains the data that has been posted by various users to the group feeds or to other feeds (such as aggregate or general feeds) supported by system 102.

Collaboration logic 122 can be accessed by users 114-120 to perform various collaboration operations, and content feed logic 124 illustratively allows the users to author posts on the various feeds, and it controls display of the various feeds. In one example, logic 124 also tracks which users have unviewed content in the various group and other feeds for groups to which they belong. Content feed logic 124 is described in greater detail below.

Each client system 104-106 can include processors or servers 150, user interface logic 152, data store 154, application component 156, private social network client component 158, and it can include other items 160. Application component 156 illustratively runs applications and uses user interface logic 152 in order to generate user interface displays 110 and to detect user inputs through those displays. Private social network component 158 illustratively interacts with private social network computing system 102 in order to provide the private social network services to user 114. It will be noted that client system 106 can be similar to client system 104, or different.

Figure 2:
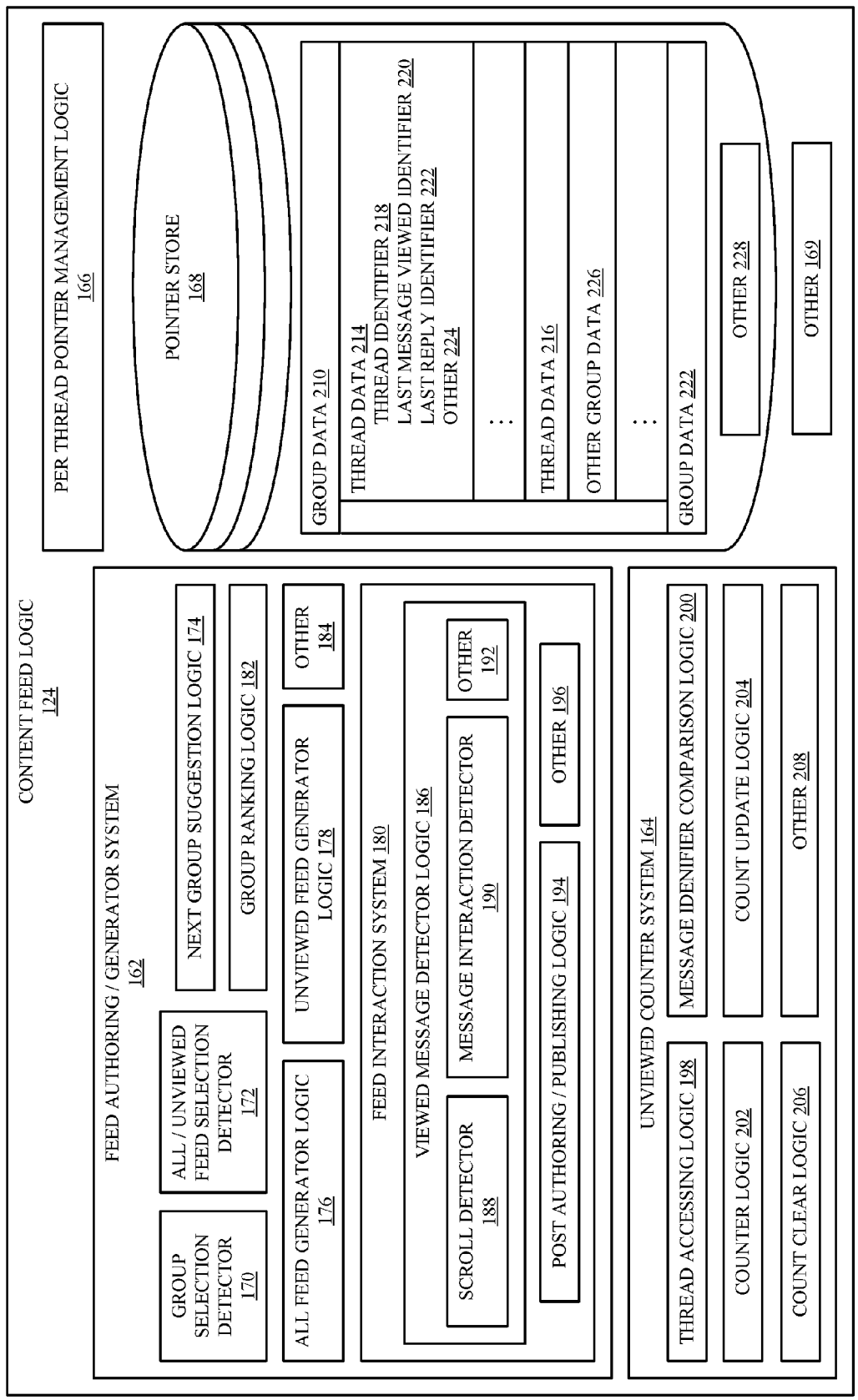
FIG. 2 is a block diagram showing one example of content feed logic in more detail.

FIG. 2 shows one example of content feed logic 124, in more detail. Again, before proceeding with the present description, it should be noted that some of the items in FIG. 2 may be provided in private social network client component 158, on the client system instead of, or in addition to, being provided on computing system 102. However, the present discussion will proceed with respect to the various items in content feed logic 124 residing on private social network computing system 102, but this is by way of example only.

FIG. 2 shows that, in one example, content feed logic 124 illustratively includes feed authoring/generator system 162, unviewed counter system 164, per-thread pointer management logic 166 and pointer store 168. It can include other items 169 as well. Feed authoring/generator system 162 illustratively includes group selection detector 170, all/unviewed feed selection detector 172, next group suggestion logic 174, all feed generator logic 176, unviewed feed generator logic 178, feed interaction system 180, group ranking logic 182, and it can include other items 184. Feed interaction system 180, itself, illustratively includes viewed message detector logic 186 (which can include scroll detector 188, message interaction detector 190 and other items 192), post authoring/publishing logic 194 and it can include other items 196.

Unviewed counter system 164 illustratively includes thread accessing logic 198, message identifier comparison logic 200, counting logic 202, count update logic 204, count clear logic 206, and it can include other items 208.

Pointer store 168 illustratively includes group data 210-212 for a wide variety of different groups. Each set of group data 210-212 illustratively includes thread data 214-216 that identifies various threads for a given group. The thread data 214-216 can include a thread identifier 218 (that identifies the thread), a last message viewed identifier 220 (that identifies the last message in the thread viewed by this user), a last reply identifier 222 (that indicates the last reply submitted by this user on this thread), and it can include other items 224. In addition to the thread data 214-216, group data 210 can include a wide variety of other data 226 corresponding to the groups. In addition, pointer store 168 can include other data or other items 228 as well.

Before describing the overall operation of content feed logic 124 and private social network architecture 100 in more detail, a brief overview of some of the items in content feed logic 124 will first be provided. Group selection detector 170 illustratively allows a user to select a group so that the user can view the group feed for that group. The group feed (as is described in greater detail below) is illustratively displayed with an actuator that allows the user to see only unviewed content for that group or to see all content for that group. All/unviewed feed selection detector 172 detects which the user has chosen. All feed generator logic 176 generates a group feed showing all the content for that group, while unviewed feed generator logic 178 generates an unviewed feed showing only unviewed content for the selected group.

When the user has viewed all of the previously unviewed content for a group, next group suggestion logic 174 provides a user message and a link to a next suggested group that contains unviewed content for this user. By actuating the link, the user is navigated to the unviewed feed for that group.

Group ranking logic 182 illustratively ranks the various groups that a user belongs to, based on the engagement level of the user with each group. For instance, if a user views, and engages with, a group feed for a first group multiple times a day, but only views, and engages with, a group feed for a second group every other day, then group ranking logic 182 will rank the first group higher than the second group. This can be done for a plurality of different groups.

Feed interaction system 180 illustratively detects user interactions with the various components or actuatable display elements in a feed so that the system can take appropriate actions. Viewed message detector 186 detects when a user has viewed a message in a thread so that the state of that message and thread can be changed from unviewed to viewed. A scroll detector 188 can determine whether the user has scrolled past a message so the thread has been seen and message interaction detector 190 detects whether the user has interacted with a message in the thread (such as liked it, replied to it, etc.). When either of these occur (e.g., when the user has scrolled past a message in a thread or interacted with a message or a thread), viewed message detector logic 186 detects that the message or thread has been viewed and can thus change the state of the message or thread. Post authoring/publishing logic 194 illustratively generates user input mechanisms that can be actuated by the user in order to author a post in a group or other feed, and to publish that post to the desired feed.

Unviewed counter system 164 illustratively includes logic that identifies a count of a number of threads that contain new messages (which have not been viewed by this user). It can illustratively generate a display of that count on a per-group basis. In addition, it can aggregate the counts from the various groups to display an overall count indicating the overall number of threads, for all groups that the user belongs to, that contain unviewed content (that is, content which has not been viewed by this user).

To obtain the counts, thread accessing logic 198 illustratively accesses the thread data 214 in pointer store 168 to identify the last message viewed identifier 220 for a given thread. Message identifier comparison logic 200 then compares that message identifier with the most recent message identifier in the thread under analysis to determine whether there have been more recent messages posted to that thread.

If so, counting logic 202 increments a counter corresponding to the number of threads that have unviewed content for this user. Count update logic 204 illustratively updates any display of that count on the user interface display, for viewing by the user. Count clear logic 206 can be used to clear the counters so that all of the content in the corresponding group feed (or in all of the feeds) is marked as viewed.

Per-thread pointer management logic 166 maintains the data in pointer store 168. Therefore, for each thread and for each user, per-thread pointer management logic 166 maintains thread data 214. It thus maintains a record of the last message viewed, for each user, and for each thread in each group that the user belongs to, using last message viewed identifier 220. Thus, thread accessing logic 198 can request such information from per-thread pointer management logic 166, when a display is being generated for a user.

Also, as the user views messages in a thread, this information is detected and provided by view message detector logic 186 to per-thread pointer management logic 166. Logic 166 can then update the data in pointer store 168 to indicate that this particular user has now viewed a message in a particular thread.

Figure 3:
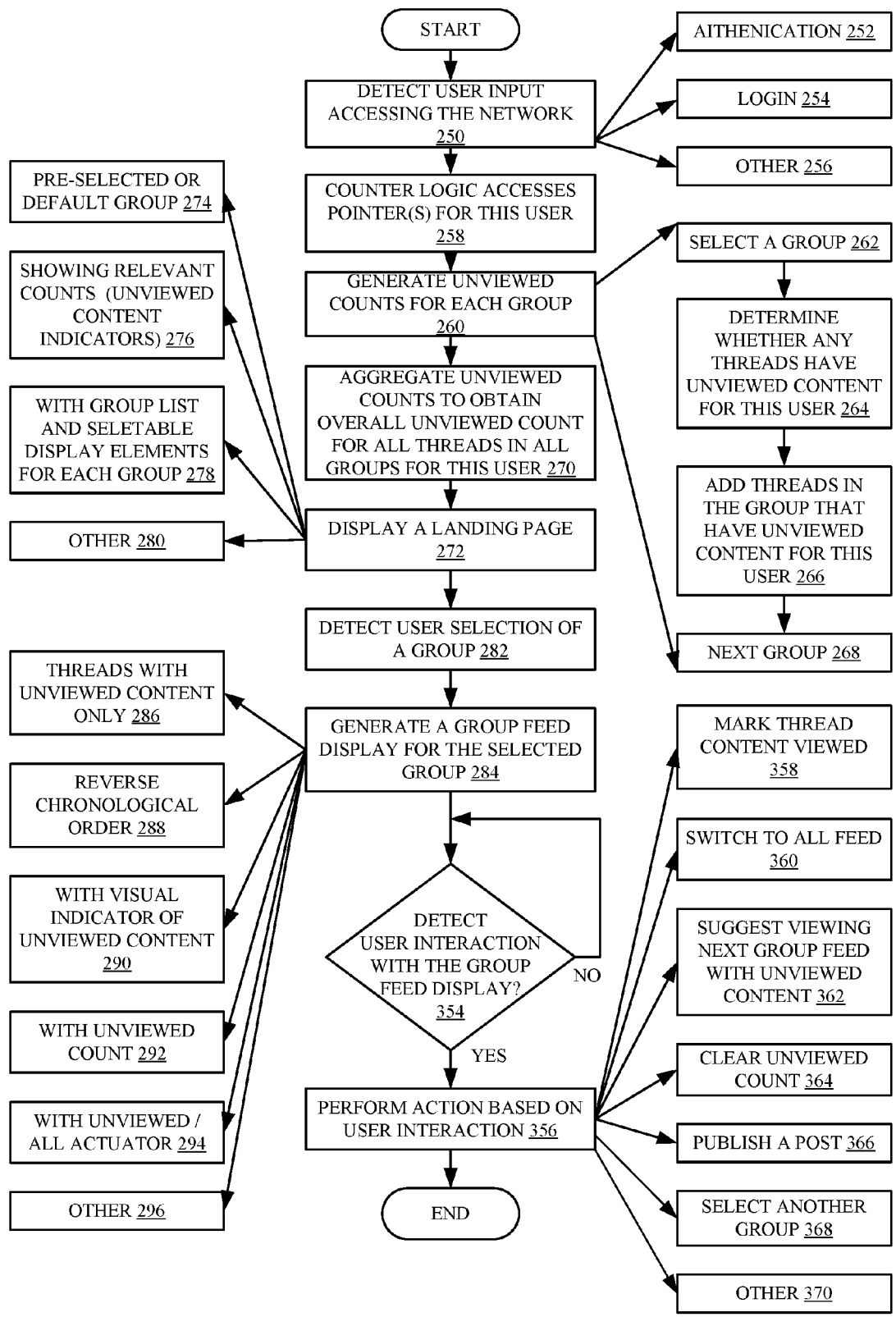
FIG. 3 is a flow diagram illustrating one example of the overall operation of the architecture illustrated in FIG. 1 in generating a group feed indicating viewed and un-viewed content.

FIG. 3 is a flow diagram illustrating the overall operation of content feed logic 124 and private social network architecture 100 in generating displays of group feeds, so that a user can easily determine whether there is any content that is unviewed by the user for the various groups that the user belongs to. Authentication logic 134 first detects a user input indicating that the user is accessing the network services provided by private social network computing system 102. This is indicated by block 250 in FIG. 3. The present description will proceed with respect to user 114 accessing private social network computing system 102 through client system 104. Of course, this is just one example.

The user input indicating that user 114 is attempting to access the social network services may be that the user has provided authentication information 252, other login information 254, or provided some other input indicating that the user is attempting to access the services provided by computing system 102. This is indicated by block 256.

Once the user has attempted to access the social network services, unviewed counter system 164 accesses the pointers in pointer store 168 for this user so that the counts of threads with unviewed content can be generated. This is indicated by block 258 in FIG. 3. It will be noted that the counts can be pre-computed and computing them in response to the user accessing the system is only one example.

To compute the counts, thread accessing logic 198 and message identifier comparison logic 200 provide information to counting logic 202 so that counting logic 202 can generate the unviewed counts for each group that the user is a member of, and an aggregate unviewed count which is the overall number of threads that have unviewed content for this user. This is indicated by block 260. In doing so, thread accessing logic 198 first selects a group (the group under analysis) for which a count is to be generated, and this is indicated by block 262. Thread accessing logic 198 obtains the last message viewed identifier 220 for each thread in the group under analysis and provides it to message identifier comparison logic 200. Logic 200 then accesses the thread data 142 to obtain a message identifier for the most recent message in each of the threads in the selected group to determine whether there have been additional messages posted to those threads, or any new threads started, since the last message viewed by this user. Determining whether any threads in the group under analysis have unviewed content for this user is indicated by block 264 in FIG. 3.

If so, then counting logic 202 adds up the number of threads in the group under analysis that have unviewed content for this user and outputs that count to count update logic 204 which can update the unviewed content count for this group, and for this user. This is indicated by block 266. If the user belongs to any other groups, then the next group is selected as the group under analysis and the process repeats to obtain a count of threads that contain unviewed content, in the newly selected group, for this user. This is indicated by block 268. This continues for each group that the user belongs to so that each group has an unviewed content count associated with it.

Counting logic 202 can also generate an aggregate unviewed count by adding together, or otherwise aggregating, the unviewed content counts for each of the groups in order to obtain an overall unviewed count, for all threads in all groups, for this user. This is indicated by block 270 in FIG. 3.

Content feed logic 124 then displays a landing page for the user that is accessing the social networking services. This is indicated by block 272. The landing page can be a page that displays a pre-selected or default group feed. This is indicated by block 274. The landing page can show all of the relevant counts (the counts that indicate the unviewed content for the various threads in the groups that the user belongs to). This is indicated by block 276. The landing page can also include a group list with selectable display elements for each group, so that the user can actuate the selectable display element to navigate to a group feed for the selected group. This is indicated by block 278. The landing page can include other items 280 as well.

At some point, the user will select a group (or one can be automatically selected or selected by default) so that the user can view the group feed for that group. This is indicated by block 282. Unviewed feed generator logic 178 then generates an unviewed group feed display for the selected group. This is indicated by block 284. In one example, the display only displays threads with unviewed content. This is indicated by block 286. The messages in those threads are illustratively displayed in reverse chronological order as indicated by block 288, and they can include visual indicators that visually indicate that the thread has unviewed content, or unviewed messages. Displaying the unviewed threads with these visual indicators is indicated by block 290 in FIG. 3.

The display also illustratively includes the unviewed content counts generated as discussed above, and as will be illustrated in more detail below. This is indicated by block 292 in FIG. 3

The display also illustratively allows the user to switch back and forth between the unviewed feed, that shows only unviewed threads for the selected group, and an all-inclusive feed that shows all content for the selected group. This is indicated by block 294 in FIG. 3. The group feed display can include other items 296 as well.

Figure 4:
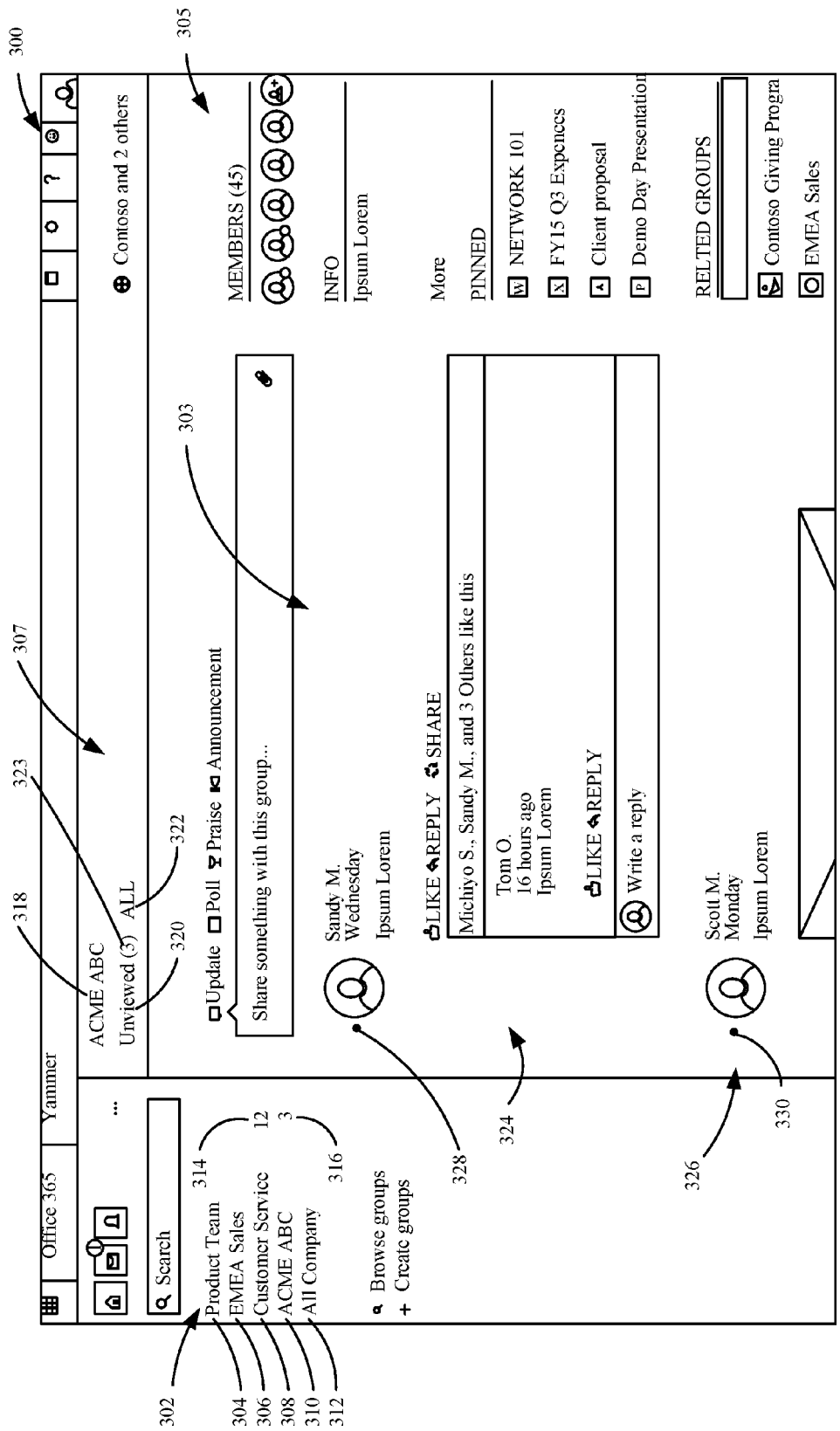
FIGS. 4 and 5 show examples of user interface displays.

Before proceeding further with the description of FIG. 3, FIG. 4 shows one example of a user interface display 300 that shows a group feed. Display 300 illustratively includes a group list portion 302 that lists the various groups that this user belongs to. Display 300 also illustratively includes group feed display portion 303, other information display portion 305, and header display portion 307.

List portion 302 illustratively includes group selection actuators 304, 306, 308, 310, and 312. When one of the actuators is actuated, the user is navigated to the group feed for the corresponding group. In addition, the unviewed counts for the groups are also shown in the example illustrated by FIG. 4. For instance, the customer service display element 308, corresponding to a customer service group, has a corresponding unviewed content count indicator 314 that shows that the group has 12 threads that have content that has not yet been viewed by this user. In addition, the ACME ABC group selection actuator 310 has an unviewed content count indicator 316 that indicates that three threads in the group feed for that group have messages that have not been viewed by the present user.

Group feed display portion 303 displays a group feed that contains threads of messages posted in the feed for the selected group. Other information display portion 305 displays other information, such as group members for the selected group, information about the selected group, related groups, etc.

Header display portion 307 illustratively includes a group identifier portion 318 and unviewed/all actuators 320 and 322. Unread content count indicator 323 can be displayed closely proximate the unviewed actuator 320. When the user actuates the unviewed actuator 320, this causes the unviewed feed generator logic 178 (shown in FIG. 2) to display the unviewed feed for the selected group in group feed display portion 303. When the user actuates the all actuator 322, this causes all feed generator logic 176 to display all of the group feed content for the selected group in the group feed display portion 303.

Group feed display portion 303 can illustratively display different threads 324-326 in the group feed. It can be seen that the user has actuated the unviewed actuator 320 so that the only threads shown in group feed display portion 303 have content that has not yet been viewed by the user. Each of the threads also illustratively includes an unviewed indicator 328 and 330, respectively. In the example shown in FIG. 4, the unviewed indicator 328 is a colored dot that indicates that the corresponding thread contains unviewed messages or content. As soon as the user views the messages or content in that thread, then indicator 328 visually changes to indicate this. In one example, it simply disappears. In another example, it may change shape, size, color, etc., in an animated way to provide visual indicia that the message or thread has now been marked as viewed. When this happens, the count indicators 314, 316 and 323 are updated (e.g., decremented) indicating that the user has now viewed one or more of the messages or threads in the selected group. In one example, once content is marked as viewed, the user is not provided with functionality to change it back. It is irreversibly (from the user's perspective) marked as viewed.

As is described in greater detail below with respect to FIGS. 6A and 6B, the user can illustratively scroll horizontally through the group feed display portion 303 in order to view the various, previously unviewed threads in the group feed for the selected group. The user may view content in other ways as well.

Figure 5:
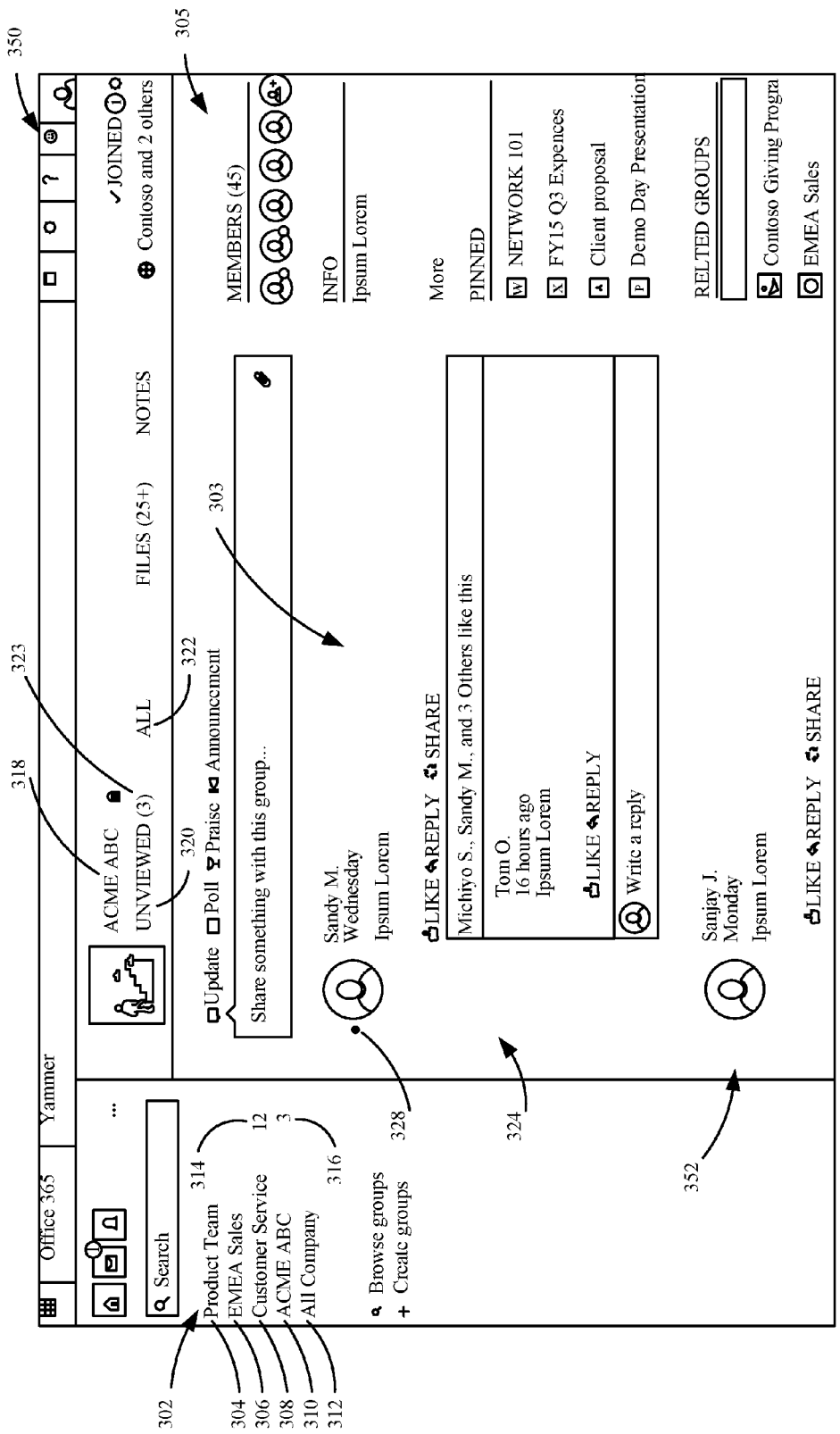

FIG. 5 is another example of a user interface display 350 that can be generated, for instance, when the user has selected the all actuator 322. It will be noted that some items in FIG. 5 are similar to those shown in FIG. 4, and they are similarly numbered. However, it can be seen in FIG. 5 that a previously viewed thread 352 is now also included in the group feed display portion 303 instead of only unviewed threads.

Returning again to the flow diagram of FIG. 3, once the group feed is displayed on the user interface display, the user can interact with the group feed in various ways. Detecting user interaction with the group feed is indicated by block 354 in FIG. 3. User interaction can illustratively be detected by feed interaction system 180 illustrated in FIG. 2. Once the user interaction has been detected, then private social network computing system 102 illustratively performs one or more different actions based upon the detected user interaction. This is indicated by block 356.

For instance, when the user has interacted with the display to indicate that the user has viewed a previously unviewed thread, then the thread can be marked as viewed. This is indicated by block 358. When the user actuates one of the unread or all actuators 320 and 322, the feed generator logic 176 and 178 can switch to generating the appropriate feed. This is indicated by block 360. When the user has viewed all previously unviewed content in a selected group, then next group suggestion logic 174 (shown in FIG. 2) can generate a display element suggesting a next group that the user should view. This is indicated by block 362 and is described below in more detail with respect to FIG. 7. If the user actuates a clear actuator, then all of the unviewed content for this group can be marked as viewed. This is indicated by block 364. The user can also interact with post authoring/publishing logic 194 in order to post a message to a thread, or start a new thread, as indicated by block 366. The user can select another group by actuating one of the actuators 304-312 so that the group feed for that group can be displayed. In one example, when this happens, the unviewed feed for the selected group is displayed first. This is indicated by block 368. The user can interact with the group feed in a variety of other ways as well, and this is indicated by block 370.

Figure 6A:
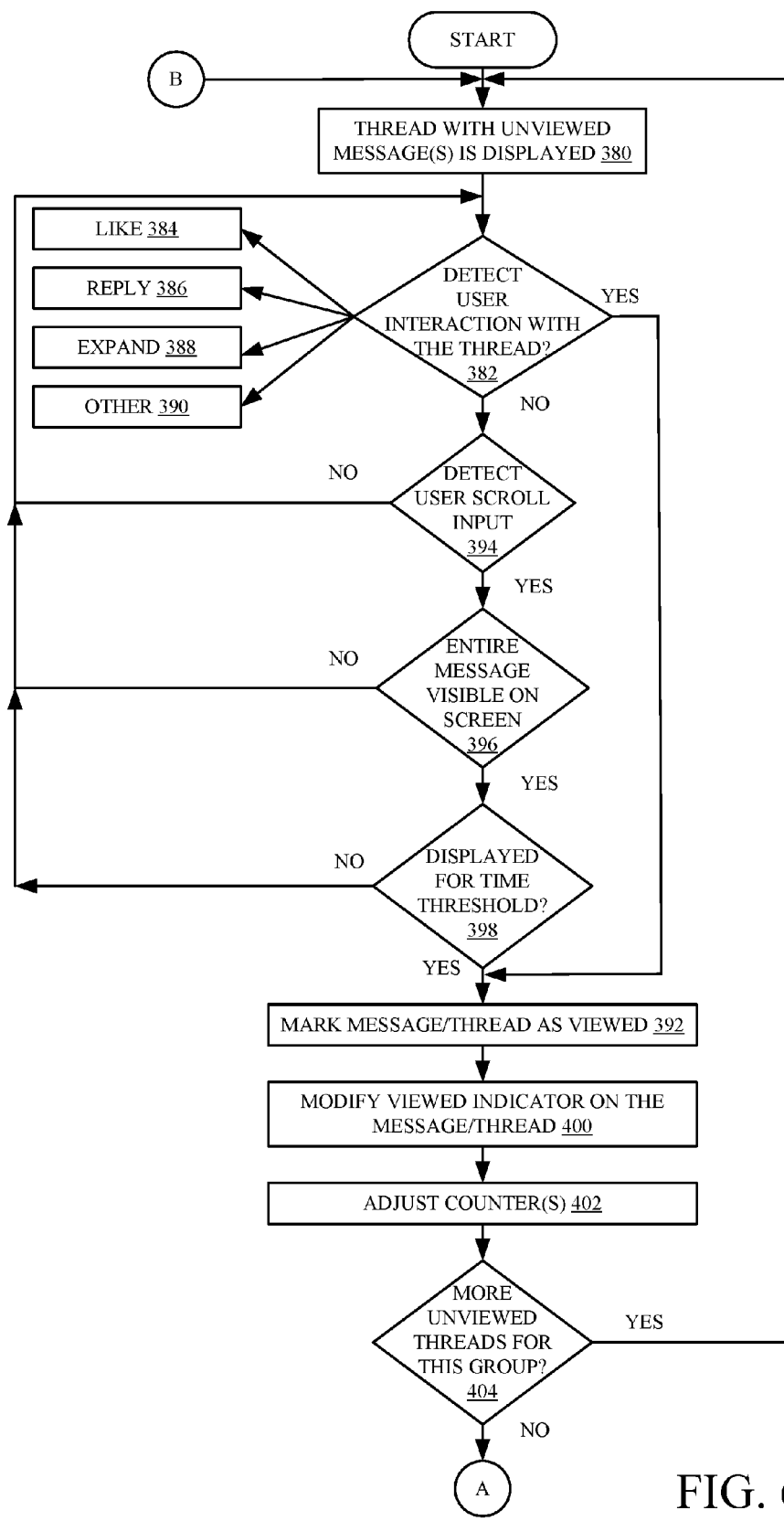
FIGS. 6A and 6B (collectively referred to herein as FIG. 6) show a flow diagram illustrating the operation of the content feed logic in determining whether content in a thread has been viewed and in navigating a user to a next group with unviewed content.
Figure 6B:
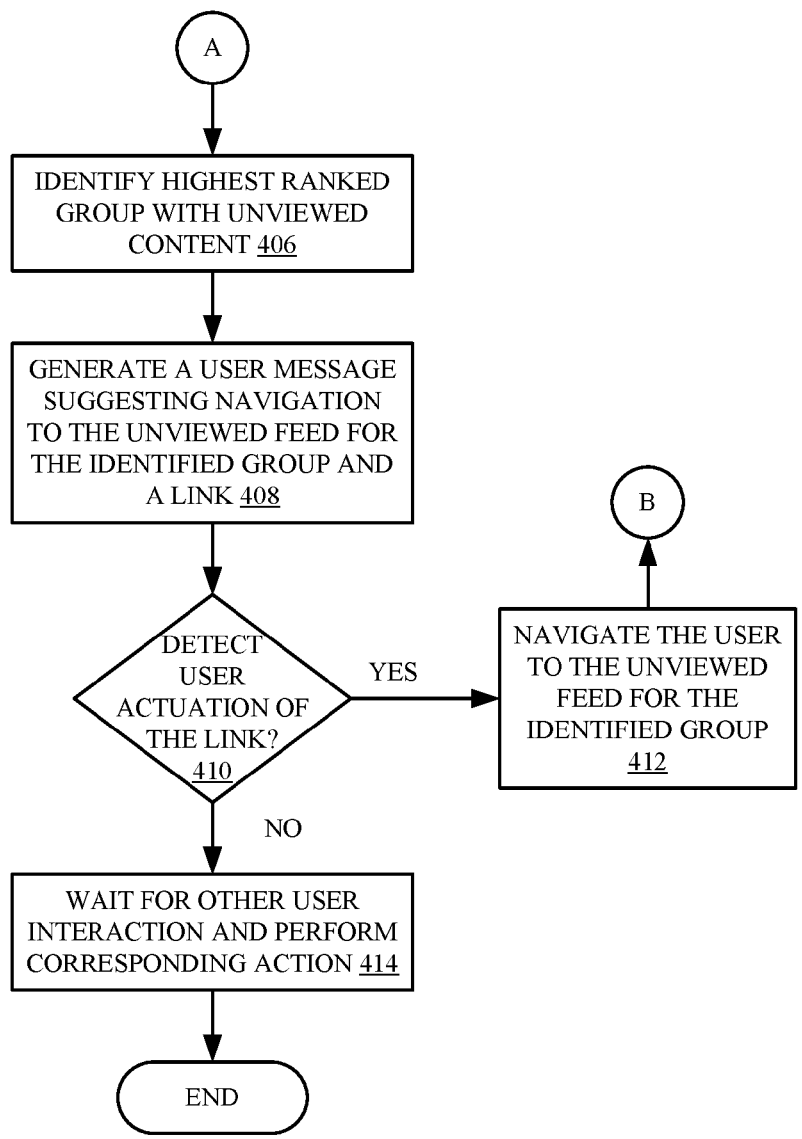

FIGS. 6A and 6B (collectively referred to herein as FIG. 6) show one example of a more detailed flow diagram illustrating the operation of viewed message detector logic 186 in detecting that a particular message or thread has been viewed by the user, when it was previously unviewed.

It is first assumed that a group feed is being displayed, and that it has a thread with unviewed messages. This is indicated by block 380 in FIG. 6, and one example of this is illustrated in FIG. 4. In order to detect that a message or a thread has been viewed, message interaction detector 190 (in FIG. 2) can detect whether the user has interacted with a message in the thread. This is indicated by block 382. For instance, the user may interact with the thread or a message in the thread by liking it, as indicated by block 384, by replying to it as indicated by block 386, by clicking on an actuator to expand the message as indicated by block 388, or in other ways as indicated by block 390.

Interacting with a thread or with a message in the thread indicates that the user has viewed the thread. Therefore, processing illustratively skips to block 392 where viewed message detector logic 186 identifies that the message has been viewed and provides this to per-thread pointer management logic 166 which can illustratively update the last message viewed identifier 220 for the corresponding thread in the thread data 214, for this user.

However, if message interaction detector 190 has not yet detected that the user has interacted with the message or the thread, the message can still be marked as viewed in other ways. For instance, scroll detector 188 can also illustratively detect that the user has scrolled the group feed. This is indicated by block 394. If so, it also illustratively detects whether an entire unviewed message is, or has been, visible on the screen, as the user scrolls. This is indicated by block 396. If not, then the message is not marked as having been viewed.

However, if, at block 396, it is determined that the entire message has been displayed, then viewed message detector logic 186 can also determine whether the message has been displayed for a sufficiently long time that it should be marked viewed. For instance, if a user very quickly scrolls past a message, it may be that the message should not be marked as viewed. However, if the message (or a portion of the message) has been displayed for a sufficient amount of time, then the message or thread may be marked as having been viewed. This is indicated by blocks 398 and 392, respectively. It will be noted that these are only some examples of detecting that a message or other thread content has been viewed, and a wide variety of others may be used as well.

Once viewed message detector logic 186 identifies that a previously unviewed message has now been viewed, and marks it as such, then, as briefly mentioned above, this is provided to per-thread pointer management logic 166. Logic 166 then updates the last message viewed identifier 220 for that corresponding thread, and the unviewed feed generator logic 178 also modifies the indicator on the message or thread to show that it has now been viewed. With reference to FIG. 4, it can modify the indicator 328 indicating that the messages in thread 324 have been viewed. Modifying the viewed indicator on the message or thread is indicated by block 400 in the flow diagram of FIG. 6.

In addition, unviewed counter system 164 also processes this information so that count update logic 204 can update the unviewed counter corresponding to the selected group. It can also update any aggregate counter that provides an aggregate count of unviewed content. Adjusting the counters is indicated by block 402 in the flow diagram of FIG. 6.

If there are more unviewed threads in this group feed, then processing continues at block 380, where those threads are displayed. For instance, as the user scrolls to a new thread containing unviewed content, processing reverts to block 380 in the flow diagram of FIG. 6. Repeating this processing for each unviewed thread in this group is indicated by block 404 in FIG. 6.

Assuming that the unviewed feed is being displayed for the selected group, and assuming that, at block 404, it is determined that the user has now viewed all of the content in all of the threads for this group, then group ranking logic 182 identifies a highest ranked group (e.g., in the group list 302 illustrated in FIG. 4) that has unviewed content. This is indicated by block 406 in the flow diagram of FIG. 6.

This information is provided to next group suggestion logic 174 which generates a user message on the user interface display suggesting that the user navigate to the unviewed feed for the identified group. This user message can also include a user actuatable link or other user input mechanism which, when actuated by the user, navigates the user to the unviewed feed for that group. Generating the user message suggesting navigation to the unviewed feed for the next group, and providing a link to that feed is indicated by block 408 in FIG. 6.

Next group suggestion logic 174 may then illustratively detect user actuation of the link. This is indicated by block 410. When this happens, unviewed feed generator logic 178 navigates the user to the unviewed feed for the identified group. This is indicated by block 412 in FIG. 6, and processing then reverts to block 380.

If the user does not actuate the link, then the system waits for other user interactions and performs corresponding interactions. This is indicated by block 414. For instance, the user may actuate a group actuator to navigate to another selected group. The user may post information to a feed, or provide a wide variety of other inputs that cause the system to perform other actions.

Figure 7:
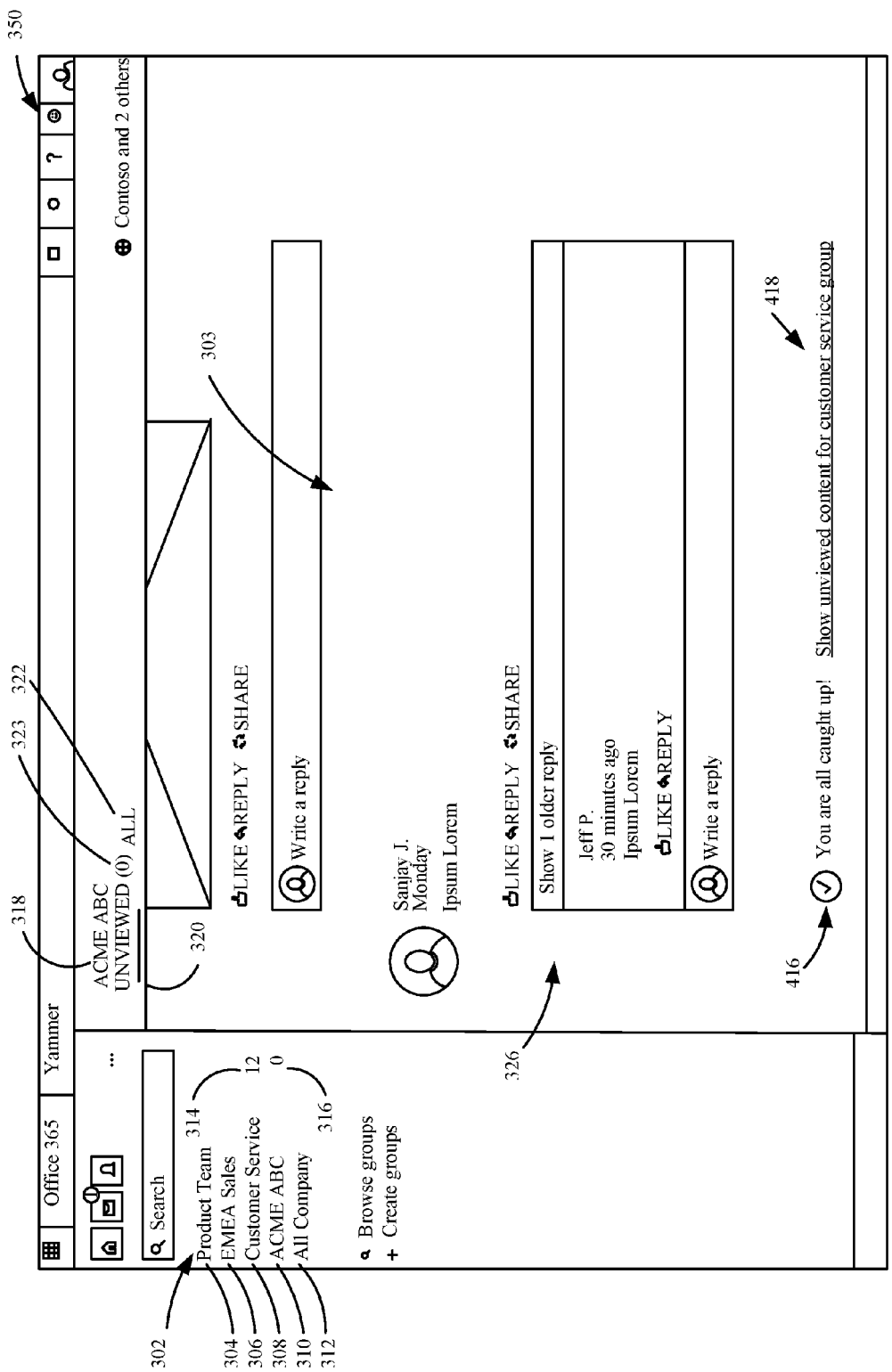

FIG. 7 is an example of another user interface display 416 that illustrates the operation of next group suggestion logic 174. If can be seen that some of the items are similar to the user interface display illustrated in FIG. 4, and they are similarly numbered. It can be seen in FIG. 7 that the user has now viewed all of the messages in the unviewed feed for the selected group (which corresponds to the group actuator 310 in list 302). Thus, the count indicators 316 and 323 have all been decremented to zero, indicating that the user no longer has any unviewed content in the corresponding group feed. Thus, next group suggestion logic 174 illustratively generates a user message, such as that shown generally at 416, indicating that the user has now viewed all of the content for the group being displayed. Group ranking logic 182 identifies the highest ranked group in list 302 that still has unviewed content. It provides an indication of that group to next group suggestion logic 174, which displays a link 418 that can be actuated to navigate to the unviewed feed for that group. FIG. 7 illustrates that the highest ranked group in list 302, that currently has unviewed content, is the "Customer Service" group. Therefore, link 418 is a link to the unviewed feed for the Customer Service group. It is a user actuatable link so that, if the user actuates link 418, then unviewed feed generator logic 178 navigates the user to the unviewed feed for the Customer Service group.

Also, as briefly mentioned above, in one example, count clear logic 206 (shown in FIG. 2) can generate a user actuatable element that can be actuated by the user in order to clear all of the unviewed content counters, and thus mark all of the content as having been viewed by the user. For instance, a user may belong to groups where the user may not wish to scroll past every message in that group, but may wish to clear the unviewed message count and mark the group as "done". FIG. 8A shows one example of a user interface display in which the group identifier 318 and the unread and all actuators 320 and 322, respectively, are slightly different than those shown, for example, in FIG. 7. However, they may function similarly.

In one example, if the user hovers over the "unread" actuator 320 in the header, then the count indicator 323 may illustratively change its visual appearance. For instance, as shown in FIG. 8B, it may change to a check mark or other visual indicator. Then, if the user hovers the cursor over the check mark, this may cause the system to provide additional information informing the user that clicking the check mark marks everything in the displayed group feed to indicate that it has been viewed. One example of this is illustrated in FIG. 8C. When the user then actuates the check mark (e.g., by clicking on it), count clear logic 206 clears the counter for the present group, and per-thread pointer management logic 166 updates the last message viewed identifier 220 for all threads in the group to the most recent message identifier that was posted in each of those threads. Count update logic 204 then updates the counter display as shown in FIG. 8D, indicating that there are no more threads with unviewed content in this group, and next group suggestion logic 174 displays a message, such as message 416 in FIG. 7, indicating that the user is all caught up with respect to this group. It can also display link 418 suggesting that the user navigates to the unviewed feed for the next highest group in list 302. If there are no more groups in list 302 with unviewed content, then the link need not be displayed. Instead, a message, such as message 420, can be generated, which simply indicates that the user is caught up and there are no more unread conversations.

It can thus be seen that the present system greatly enhances the performance of the computing system itself. It surfaces only unviewed content, in a separate feed, for each given group. Thus, the feed has a finite number of threads or messages displayed in it, so that, when the user reaches the bottom of the feed, the user knows that he or she has seen all unviewed content corresponding to that group feed. In addition, while the user is viewing the unviewed content, if new content is added to the group feed, the user is illustratively redirected to the new content before indicating that the user is up to date. This not only ensures that a user can quickly and easily view all unviewed content for a group, but it provides the user with confidence that he or she has indeed seen all unviewed content for a group.

Further, per-thread pointer management logic 166 maintains a pointer for each thread in each group, on a per-user basis, identifying the last message in each thread that the user viewed. This allows unviewed counter system 164 to quickly and accurately obtain a count of unviewed threads, per group, for the user, and display that so that the user knows how much unviewed content he or she has in each group.

Also, the system provides two separate feeds, one with only unviewed content, and one with all content for the group. It also provides real time detection as to whether a thread or messages within a thread have been viewed by the user, without the user needing to interact with a specific message or thread, except to scroll past it. The system thus maintains an accurate count of viewed and unviewed messages in each group. In addition, the system more quickly surfaces the most relevant content for a given user. When the user has finished viewing unviewed content in a particular group feed, the next most relevant group (that most engaged with by the user) that has unviewed content is suggested to the user and a link is automatically provided. Upon detection of user actuation of that link, the system automatically surfaces the unviewed feed for that next most relevant group.

Similarly, because the per-thread pointer management logic maintains the pointer on a per-thread basis, the state of a thread (e.g., whether it has unviewed content) is the same regardless of where content was viewed. Therefore, this greatly reduces the message duplication across the system so that the user does not see the same threads as being unread, in multiple locations, even after the user has already viewed the content in a different location. For instance, if the user views the content in a group feed, the same content will not show up as unviewed in an aggregate feed. The state of the content of a particular thread is maintained in pointer store 168, regardless of where the thread appears. This greatly reduces message duplication within the system.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 9:
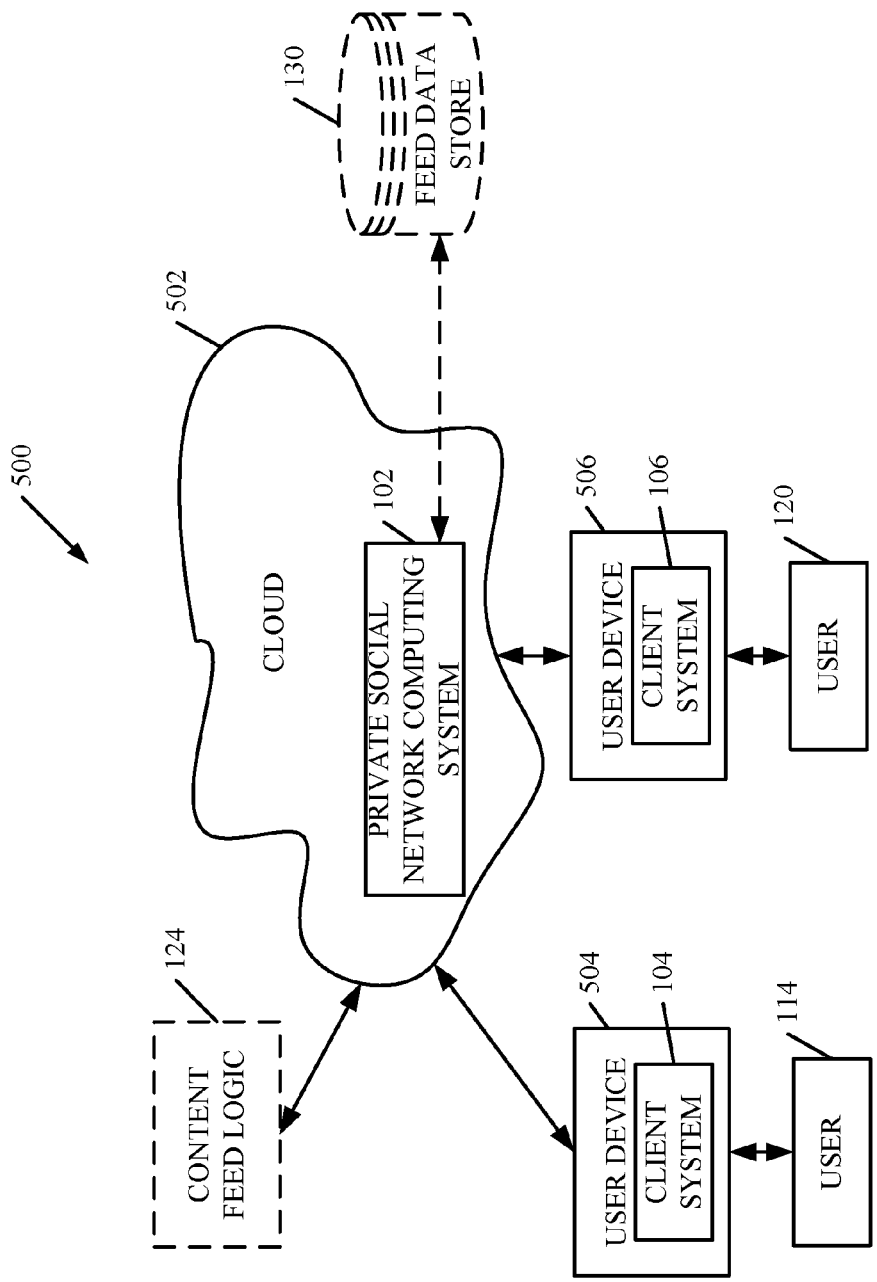
FIG. 9 is a block diagram of one example of the architecture shown in FIG. 1, deployed in a cloud computing architecture.

FIG. 9 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 9, some items are similar to those shown in FIG. 1 and they are similarly numbered. FIG. 9 specifically shows that private social network computing system 100 can be located in cloud 502 (which can be public, private, or a combination where portions are public while others are private). Therefore, users 114-120 use user devices 504-506 that include client systems 104-106, respectively, to access system 102 through cloud 502.

FIG. 9 also depicts another example of a cloud architecture. FIG. 9 shows that it is also contemplated that some elements of system 102 can be disposed in cloud 502 while others are not. By way of example, data store 130 can be disposed outside of cloud 502, and accessed through cloud 502. In another example, content feed logic 124 can be outside of cloud 502. Regardless of where they are located, they can be accessed directly by devices 504-506, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 10:
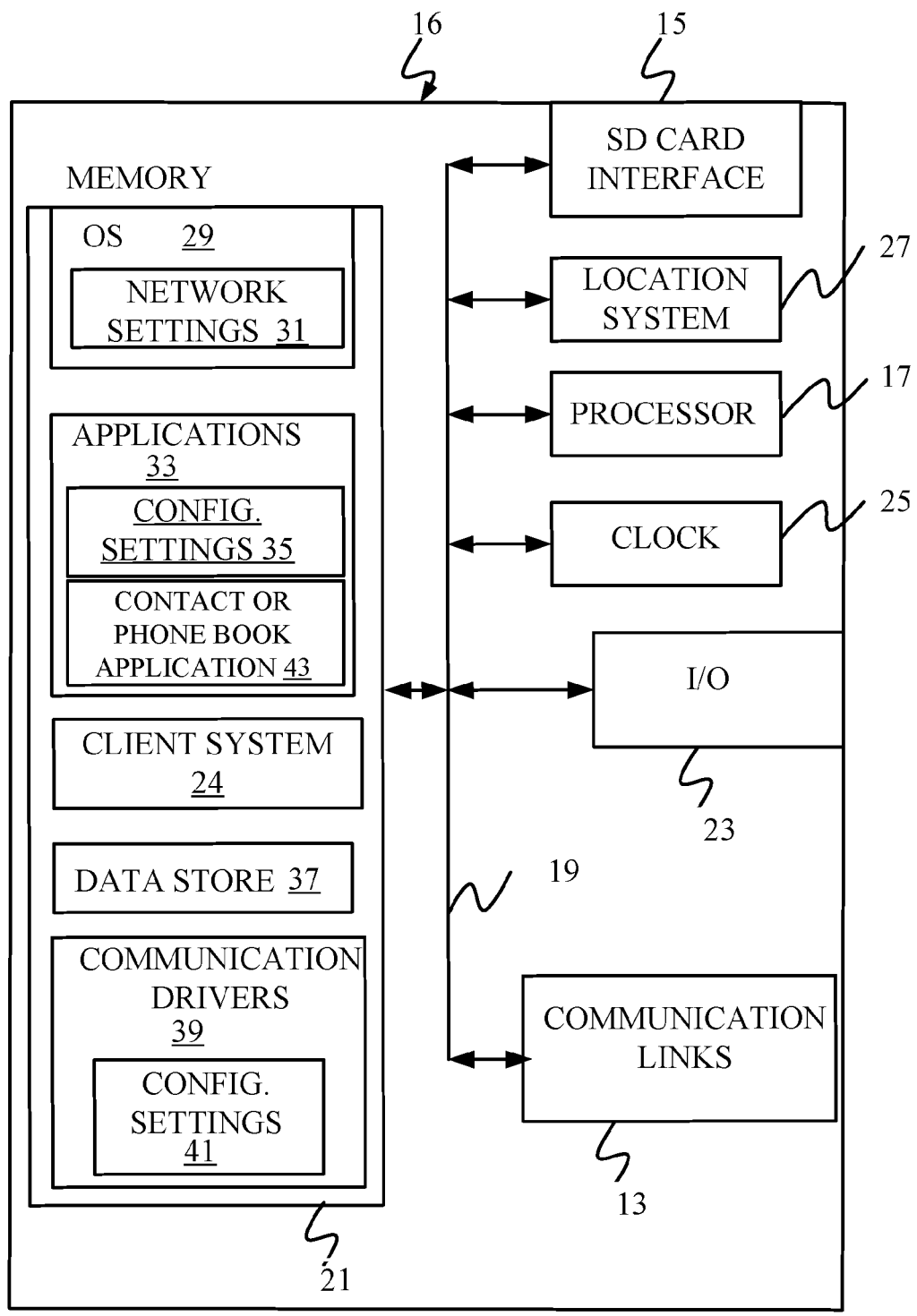
FIGS. 10-12 show examples of mobile devices that can be used in the architectures shown in the previous figures.
Figure 11:
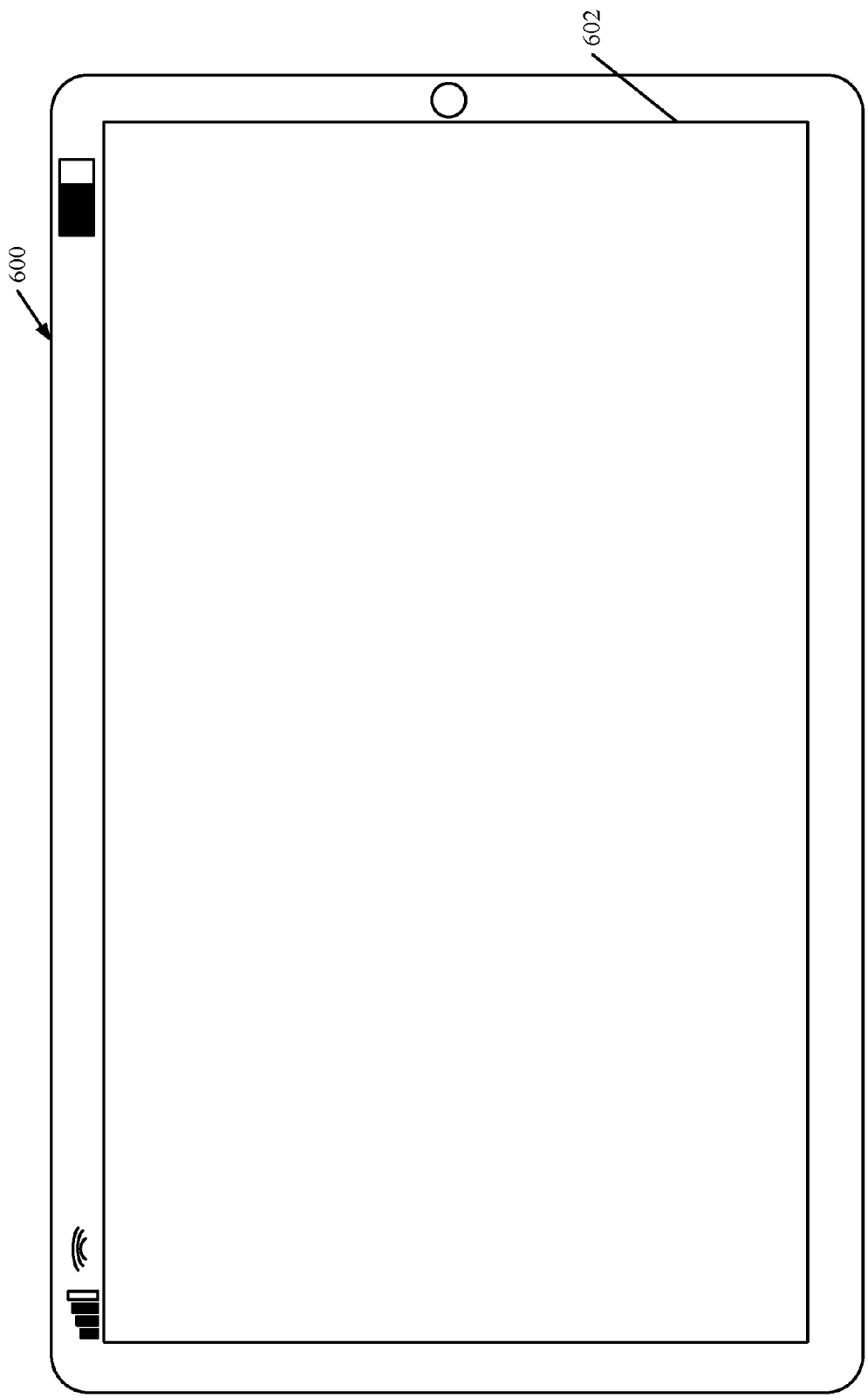
Figure 12:
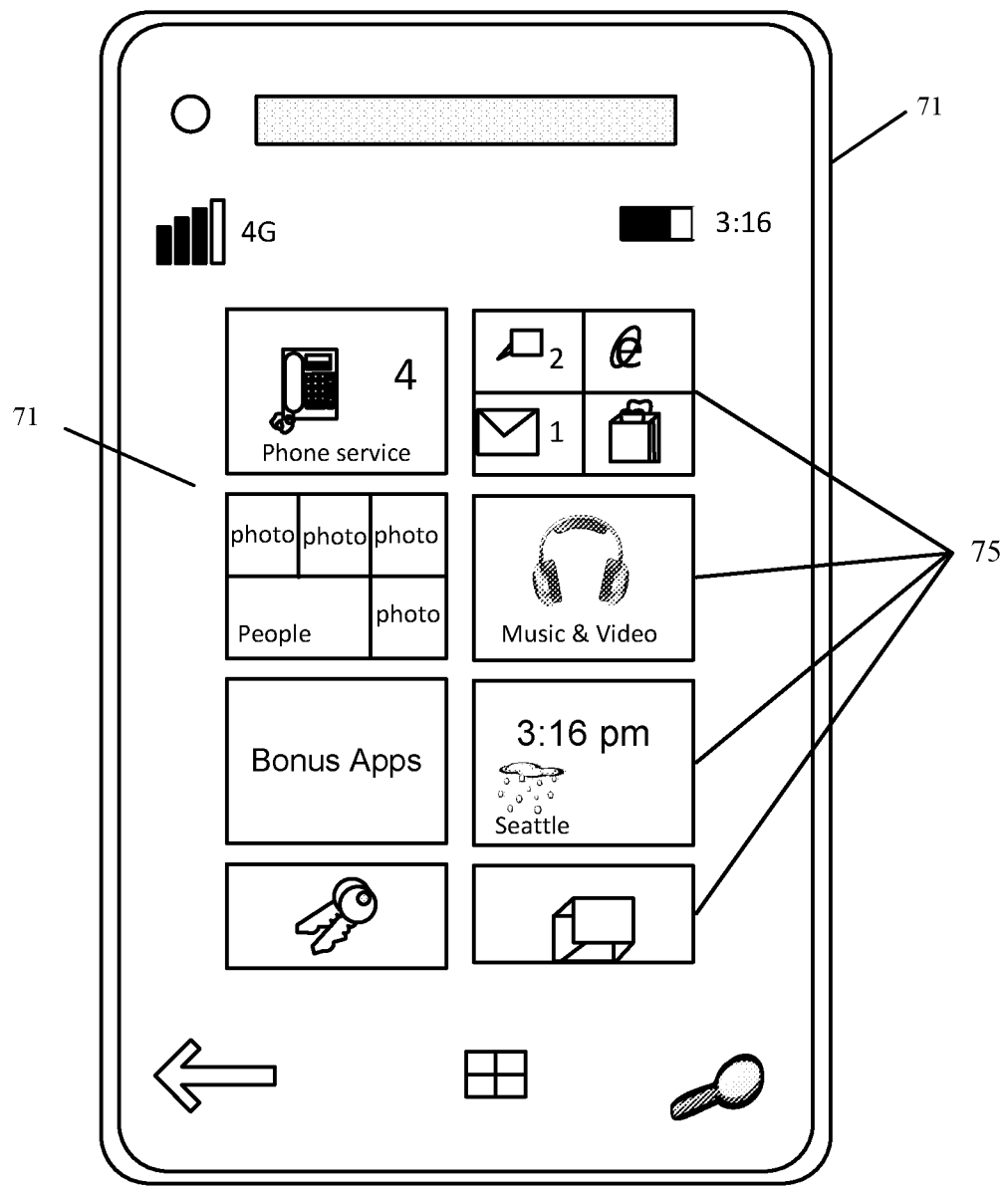

FIG. 10 is a simplified block diagram of one illustrative example of a handheld or mobile computing device that can be used as a user's or client's hand held device 16, in which the present system (or parts of it) can be deployed. FIGS. 11-12 are examples of handheld or mobile devices.

FIG. 10 provides a general block diagram of the components of a client device 16 that can run components of architecture 100 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or servers from previous Figures) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client business system 24 which can run various applications or embody parts or all of system 102. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 11 shows one example in which device 16 is a tablet computer 600. In FIG. 11, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 12 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 13:
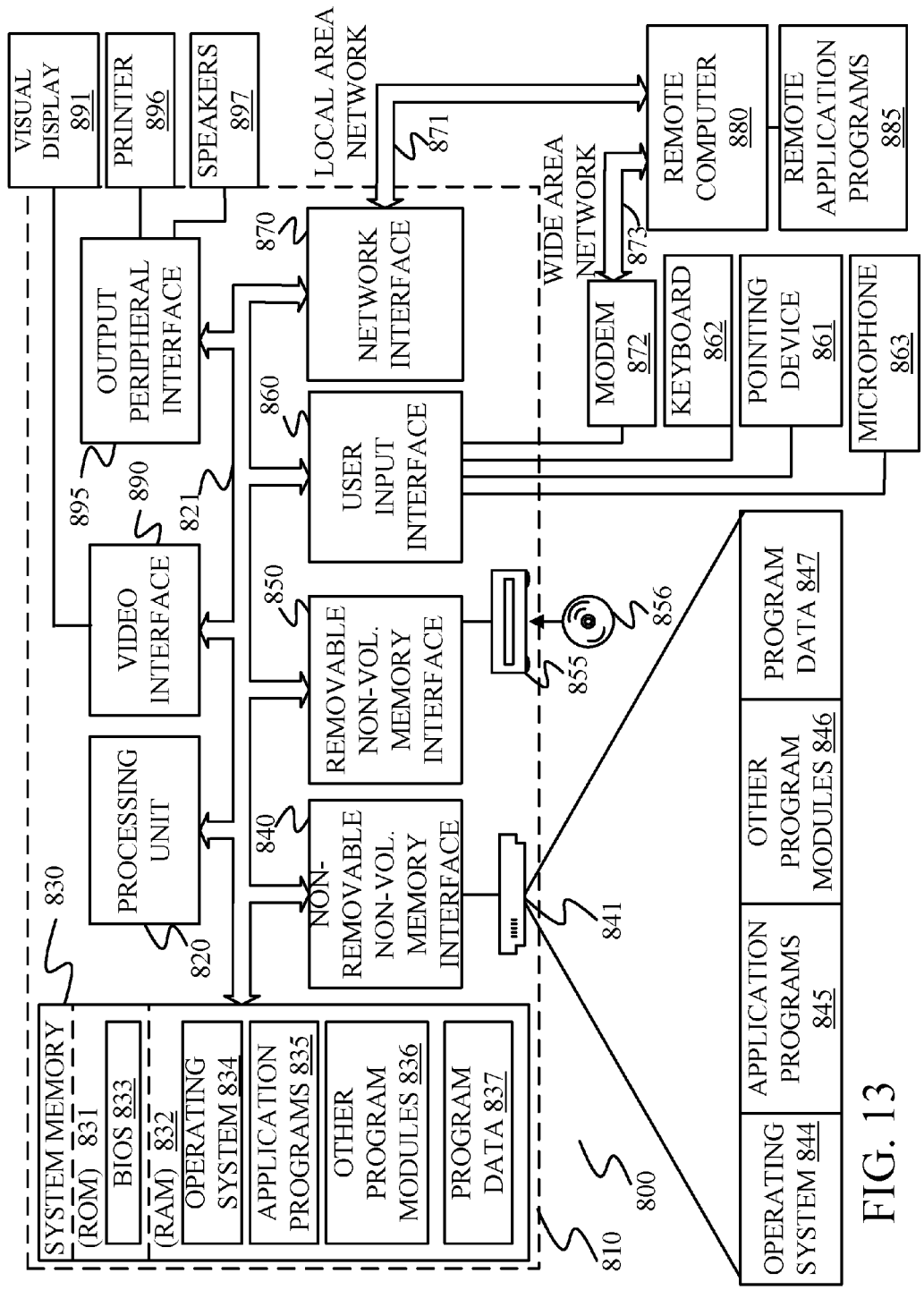
FIG. 13 is a block diagram of one example of a computing environment that can be used in the architectures shown in the previous figures.

FIG. 13 is one example of a computing environment in which architecture 100, or parts of it, (for example) can be deployed. With reference to FIG. 13, an example system for implementing some embodiments includes a general-purpose computing device in the form of a computer 810. Components of computer 810 may include, but are not limited to, a processing unit 820 (which can comprise processors or servers from previous Figures), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 13.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 13 illustrates operating system 834, application programs 835, other program modules 836, and program data 837.

The computer 810 may also include other removable/non-removable volatile/nonvolatile computer storage media. By way of example only, FIG. 13 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 13, provide storage of computer readable instructions, data structures, program modules and other data for the computer 810. In FIG. 13, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 13 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 13 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:

per-thread pointer management logic that maintains, for each of a plurality of different corresponding threads in a group feed in a private social network computing system, a last message viewed identifier, the last message viewed identifier identifying a last message, in the corresponding thread, viewed by a user; and unviewed feed generator logic that identifies unviewed threads in the group feed based on the last message viewed identifier, for the user and, in response to a user input, generates an unviewed feed to display the unviewed threads in a separate feed from previously viewed threads in the group feed.

Example 2 is the computing system of any or all previous examples and further comprising:

all feed generator logic that generates an all content feed to display previously viewed and unviewed threads in the group feed.

Example 3 is the computing system of any or all previous examples and further comprising:

an all/unviewed feed selection detector that detects a user selected feed indicative of a selected one of the all content feed and the unviewed feed and indicates to the unviewed feed generator logic and the all feed generator logic the user selected feed.

Example 4 is the computing system of any or all previous examples and further comprising:

viewed message detector logic that detects when a subsequent message in the corresponding thread is viewed by the user and generates an indication that the subsequent message has been viewed, the per-thread pointer management logic updating the last message viewed identifier for the corresponding thread based on the indication from the viewed message detector logic.

Example 5 is the computing system of any or all previous examples wherein the viewed message detector logic comprises:

a message interaction detector that detects user interaction with the subsequent message and detects that the subsequent message has been viewed by the user based on the detected user interaction.

Example 6 is the computing system of any or all previous examples wherein the viewed message detector logic is configured to detect when the subsequent message is fully displayed on a user display screen and, in response, generate the indication that the subsequent message has been viewed.

Example 7 is the computing system of any or all previous examples wherein the viewed message detector logic comprises:

a scroll detector configured to detect a scroll input indicative of the user scrolling the subsequent message through the display screen.

Example 8 is the computing system of any or all previous examples wherein the unviewed feed generator is configured to display each unviewed thread with an unviewed visual indicator indicating that the unviewed thread is unviewed and to modify an appearance of the unviewed visual indicator when the unviewed thread is viewed.

Example 9 is the computing system of any or all previous examples and further comprising next group suggestion logic that identifies a next group that has an unviewed thread and, in response to the viewed message detector logic detecting that the user has viewed all threads in the unviewed feed for the group, generating a user message indicating that the user has viewed all messages in the group feed and including a user actuatable link to an unviewed feed for the identified next group.

Example 10 is the computing system of any or all previous examples and further comprising:

an unviewed counter system that counts the unviewed threads in the group feed and generates a count display displaying the count of the unviewed threads for each group feed.

Example 11 is the computing system of any or all previous examples wherein the unviewed thread counter system comprises:

count update logic that updates the count display based on changes to the last message viewed identifier.

Example 12 is a computer implemented method, comprising:

displaying a group list comprising a group selector corresponding to a group, with which a user is associated, in a private social network computing system;

displaying a count indicator indicative of a number of unviewed threads in a group feed corresponding to the group, the unviewed threads having content not previously viewed by the user;

displaying an unviewed feed that includes the unviewed threads, separate from a general feed that includes previously viewed threads and the unviewed threads;

detecting a user input indicative of the user viewing the content not previously viewed by the user; and updating the count indicator as the user input indicative of the user viewing the content is detected.

Example 13 is the computer implemented method of any or all previous examples and further comprising:

displaying a user actuatable feed selector that is actuated by the user to switch between viewing the unviewed feed and the general feed.

Example 13 is the computer implemented method of any or all previous examples wherein displaying the user actuatable feed selector comprises displaying the user actuatable feed selector in a header portion of the unviewed feed as a first actuator visually indicative of the unviewed feed and a second actuator visually indicative of the general feed Example 14 is the computer implemented method of any or all previous examples and further comprising:

detecting user actuation of one of the first and second actuators and displaying the unviewed feed or the general feed, respectively, based on the detected user actuation.

Example 15 is the computer implemented method of any or all previous examples and further comprising:

detecting that the user has viewed all of the threads in the unviewed feed;

displaying a user actuatable link to another group in the group list, that has unviewed threads.

Example 16 is the computer implemented method of any or all previous examples and further comprising:

in response to detecting that the user has viewed all of the threads in the unviewed feed, identifying the other group as a group that the user is most engaged with, and that has unviewed threads.

Example 17 is the computer implemented method of any or all previous examples wherein displaying the user actuatable link comprises:

displaying a message identifying the other group.

Example 18 is a computing system, comprising:

per-thread pointer management logic that maintains, for each of a plurality of different corresponding threads in a group feed in a private social network computing system, a last message viewed identifier, the last message viewed identifier identifying a last message, in the corresponding thread, viewed by a user;

unviewed feed generator logic that identifies unviewed threads in the group feed based on the last message viewed identifier, for the user and, in response to a user input, generates an unviewed feed to display the unviewed threads in a separate feed from previously viewed threads in the group feed;

all feed generator logic that generates an all content feed to display previously viewed and unviewed threads in the group feed; and an all/unviewed feed selection detector that detects a user selected feed indicative of a selected one of the all content feed and the unviewed feed and indicates to the unviewed feed generator logic and the all feed generator logic the user selected feed.

an unviewed counter system that counts the unviewed threads in the group feed and generates a count display displaying the count of the unviewed threads for each group feed.

Example 19 is the computing system of any or all previous examples and further comprising:

viewed message detector logic that detects when a subsequent message in the corresponding thread is viewed by the user and generates an indication that the subsequent message has been viewed, the per-thread pointer management logic updating the last message viewed identifier for the corresponding thread based on the indication from the viewed message detector logic.

Example 20 is the computing system of any or all previous examples and further comprising:

an unviewed counter system that counts the unviewed threads in the group feed and generates a count display displaying the count of the unviewed threads for each group feed; and count update logic that updates the count display based on changes to the last message viewed identifier.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
   at least one processor; and
   memory storing instructions executable by the at least one processor, wherein the instructions, when executed, provide:
   per-thread pointer management logic configured to:
   generate, for a first thread in a group feed in a private social network computing system, a first last message viewed identifier that identifies a last viewed message, in the first thread, viewed by a user; and
   generate, for a second thread in the group feed, a second last message viewed identifier that identifies a last viewed message, in the second thread, viewed by the user; and
   unviewed feed generator logic configured to:
   receive a request to generate an unviewed feed;
   determine that the first thread includes one or more unviewed messages, that have not been viewed by the user, based on a comparison of the first last message viewed identifier to a most recent message in the first thread;
   determine that the second thread includes one or more unviewed messages, that have not been viewed by the user, based on a comparison of the second last message viewed identifier to a most recent message in the second thread;
   identify the first and second threads as unviewed threads associated with the user, in the group feed; and
   based on identifying the first and second threads as unviewed threads, generate the unviewed feed to display the first and second threads in a separate feed, that is separate from another previously viewed thread in the group feed.

2. The computing system of claim 1 wherein the instructions provide:
   all feed generator logic configured to generate an all content feed that displays the unviewed threads and previously viewed threads in the group feed.

3. The computing system of claim 2 wherein the instructions provide:
   an all/unviewed feed selection detector configured to:
   detect a user selected feed indicative of a selected one of the all content feed and the unviewed feed; and
   provide an indication of the user selected feed to the unviewed feed generator logic and the all feed generator logic.

4. The computing system of claim 1 wherein the instructions provide:
   viewed message detector logic configured to detect when a subsequent message in the first thread is viewed by the user and generate an indication that the subsequent message has been viewed,
   the per-thread pointer management logic being configured to update the first last message viewed identifier for the first thread based on the indication from the viewed message detector logic.

5. The computing system of claim 4 wherein the viewed message detector logic comprises:
   a message interaction detector configured to detect user interaction with the subsequent message and detect that the subsequent message has been viewed by the user based on the detected user interaction.

6. The computing system of claim 4 wherein the viewed message detector logic is configured to detect when the subsequent message is fully displayed on a user display screen and, in response, generate the indication that the subsequent message has been viewed.

7. The computing system of claim 6 wherein the viewed message detector logic comprises:
   a scroll detector configured to detect a scroll input indicative of the user scrolling the subsequent message through the display screen.

8. The computing system of claim 1 wherein the unviewed feed generator logic is configured to display each unviewed thread with an unviewed visual indicator indicating that the unviewed thread is unviewed and to modify an appearance of the unviewed visual indicator when the unviewed thread is viewed.

9. The computing system of claim 1 wherein the instructions provide:
   next group suggestion logic configured to:
      identify a next group that has an unviewed thread; and
      in response to the viewed message detector logic detecting that the user has viewed all threads in the unviewed feed for the group, generate a user message indicating that the user has viewed all messages in the group feed and including a user actuatable link to an unviewed feed for the identified next group.

10. The computing system of claim 1 wherein the instructions provide:
    an unviewed thread counter system configured to:
       count the unviewed threads in the group feed; and
       generate a count display displaying the count of the unviewed threads for each group feed.

11. The computing system of claim 10 wherein the unviewed thread counter system comprises:
    count update logic configured to update the count display based on changes to one of the first last message viewed identifier or the second last message viewed identifier.

12. A computer implemented method, comprising:
    accessing group membership information associated with a user;
    based on the group membership information, identifying a plurality of different groups that a user is a member of in a private social network computing system, wherein each group comprises a plurality of threads, and each thread comprises one or more items of content;
    displaying a user interface display comprising a group list having group display elements representing the plurality of different groups,
       each group display element being actuatable to select one of the groups represented by the group display element;
    based on an indication of actuation of a first one of the group display elements, selecting a first one of the groups represented by the first group display element;
    displaying a count indicator indicative of a number of unviewed threads in the first group, each unviewed thread having content not previously viewed by the user;
    displaying an unviewed feed that includes the unviewed threads in the first group, separate from a general feed for the first group that includes previously viewed threads in the first group and the unviewed threads in the first group;
    detecting a user input indicative of the user viewing the content not previously viewed by the user; and
    updating the count indicator as the user input indicative of the user viewing the content is detected.

13. The computer implemented method of claim 12 and further comprising:
    displaying a user actuatable feed selector in a header portion of the unviewed feed as a first actuator visually indicative of the unviewed feed and a second actuator visually indicative of the general feed, wherein the user actuatable feed selector is actuatable by the user to switch between viewing the unviewed feed and the general feed.

14. The computer implemented method of claim 13 and further comprising:
    detecting user actuation of one of the first and second actuators and displaying the unviewed feed or the general feed, respectively, based on the detected user actuation.

15. The computer implemented method of claim 12 and further comprising:
    detecting that the user has viewed all of the threads in the unviewed feed;
    displaying a user actuatable link to another group in the group list, that has unviewed threads.

16. The computer implemented method of claim 15 and further comprising:
    in response to detecting that the user has viewed all of the threads in the unviewed feed, identifying the other group as a group that the user is most engaged with, and that has unviewed threads.

17. The computer implemented method of claim 15 wherein displaying the user actuatable link comprises:
    displaying a message identifying the other group.

18. A computing system, comprising:
    at least one processor; and
    memory storing instructions executable by the at least one processor, wherein the instructions, when executed, cause the computing system to:
       generate, for a first thread in a group feed in a private social network computing system, a first last message viewed identifier that identifies a last viewed message, in the first thread, viewed by a user;
       generate, for a second thread in the group feed, a second last message viewed identifier that identifies a last viewed message, in the second thread, viewed by the user;
       determine that the first thread includes one or more unviewed messages, that have not been viewed by the user, based on a comparison of the first last message viewed identifier to a most recent message in the first thread;
       determine that the second thread includes one or more unviewed messages, that have not been viewed by the user, based on a comparison of the second last message viewed identifier to a most recent message in the second thread;
       identify the first and second threads as unviewed threads, associated with the user, in the group feed;
       generate an unviewed feed to display the first and second threads in a separate feed, that is separate from another previously viewed thread in the group feed;
       generate an all content feed to display the first and second threads and the other previously viewed thread in the group feed;
       detect a user selected feed indicative of a selected one of the all content feed and the unviewed feed; and
       provide an indication of the user selected feed.

19. The computing system of claim 18 wherein the instructions cause the computing system to:
    detect when a subsequent message in the first thread is viewed by the user; and
    generate an indication that the subsequent message has been viewed,
    update a first last message viewed identifier based on the indication.

20. The computing system of claim 19 wherein the instructions cause the computing system to:
    count the unviewed threads in the group feed and generate a count display displaying the count of the unviewed threads for each group feed; and update the count display based on changes to the first last message viewed identifier for the first thread.

\* \* \* \* \*